United States Patent
Zhao et al.

(10) Patent No.: US 8,814,710 B2
(45) Date of Patent: Aug. 26, 2014

(54) TORQUE TRANSMISSION ASSEMBLY AND COUPLING

(71) Applicant: Johnson Electric S.A., Murten (CH)

(72) Inventors: Kai Zhao, Shenzhen (CN); Jin An Nie, Shenzhen (CN); Hai Qiang Zhou, Shenzhen (CN)

(73) Assignee: Johnson Electric S.A., Murten (CH)

( * ) Notice: Subject to any disclaimer, the term of this patent is extended or adjusted under 35 U.S.C. 154(b) by 0 days.

(21) Appl. No.: 13/793,038

(22) Filed: Mar. 11, 2013

(65) Prior Publication Data

US 2013/0233669 A1 Sep. 12, 2013

(30) Foreign Application Priority Data

Mar. 9, 2012 (CN) .......................... 2012 1 0061572

(51) Int. Cl.
  *F16D 3/12* (2006.01)
  *F16D 3/68* (2006.01)
(52) U.S. Cl.
  USPC ............................................ 464/73; 464/157
(58) Field of Classification Search
  USPC ........ 464/73–76, 92, 149, 157–159; 403/274, 403/281, 282, 364
  See application file for complete search history.

(56) References Cited

U.S. PATENT DOCUMENTS

| | | | | |
|---|---|---|---|---|
| 3,834,182 A | * | 9/1974 | Trask et al. ................. | 464/92 X |
| 5,564,981 A | * | 10/1996 | Iwabuchi et al. ............... | 464/73 |
| 7,670,228 B2 | | 3/2010 | Matsumoto et al. | |
| 7,883,423 B2 | * | 2/2011 | Kubota et al. .................. | 464/73 |
| 2012/0004044 A1 | * | 1/2012 | Conger et al. | |

FOREIGN PATENT DOCUMENTS

| | | | | |
|---|---|---|---|---|
| EP | 1063410 | * | 12/2000 | |
| EP | 1253700 | | 1/2011 | |
| GB | 2078340 | * | 1/1982 | ..................... 464/75 |

* cited by examiner

*Primary Examiner* — Gregory Binda
*Assistant Examiner* — Josh Skroupa
(74) *Attorney, Agent, or Firm* — Muncy, Geissler, Olds & Lowe, P.C.

(57) ABSTRACT

A torque transmission assembly has a first shaft, a second shaft and a coupling. The coupling has a first connecting member and a second connecting member. The first connecting member is coaxially fixed to the first shaft. The second connecting member is fixed to the second shaft. The first connecting member has a base with a metallic engaging member embedded inside. The engaging member directly connects to the first shaft. A plurality of projecting members is formed on the base. The projecting members extend in the axial direction and are circumferentially spaced. The second connecting member has a main body and a plurality of drive arms radially extending from the main body. The drive arms are sandwiched between corresponding projecting members of the first connecting member so that the first connecting member and the second connecting member rotate together.

21 Claims, 4 Drawing Sheets

TORQUE TRANSMISSION ASSEMBLY AND COUPLING

CROSS REFERENCE TO RELATED APPLICATIONS

This non-provisional patent application claims priority under 35 U.S.C. §119(a) from Patent Application No. 201210061572.1 filed in The People's Republic of China on Mar. 9, 2012.

FIELD OF THE INVENTION

This invention relates to a torque transmission assembly and in particular, to a coupling for joining together two rotary shafts.

BACKGROUND OF THE INVENTION

A coupling generally comprises two connecting members of same structure, and a cushioning member disposed between the two connecting members. Each of the connecting members generally comprises a base and a plurality of connecting arms extending to the other connecting member. The cushioning member typically comprises an annular ring and a plurality of cushioning arms extending radially outwardly from the outside of the ring. Each of the cushioning arms is sandwiched between two connecting arms extending from a respective one the connecting members. The annular ring is surrounded by the connecting arms. One of the bases is connected to a motor shaft, and the other one is connected to an output shaft, so that output torque is transmitted from the motor shaft to the output shaft. However, the axial length of the coupling is large since each of the connecting members comprises a base.

SUMMARY OF THE INVENTION

Hence there is a desire for a coupling having a compact axial dimension.

Accordingly, in one aspect thereof, the present invention provides a coupling for coaxially connecting a first rotary shaft to a second rotary shaft, the coupling comprising: a first connecting member arranged to be connected to the first rotary shaft for rotation there with; and a second connecting member arranged to be connected to the second rotary shaft for rotation there with, wherein the first connecting member comprises: a base comprising a plurality of projecting members extending in the axial direction of the coupling, the projecting members being spaced from each other in the circumferential direction of the coupling; and a metallic engaging member is non-detachably engaged with the base, the engaging member being directly connectable to the first rotary shaft; and wherein the second connecting member comprises: a main body and a plurality of drive arms extending from peripheral portions of the main body, the drive arms extending in radial directions of the coupling and respectively sandwiched between adjacent projecting members of the first connecting member, thereby the first connecting member and the second connecting member rotate together.

Preferably, the base is made of plastic and the engaging member is embedded in the base.

Preferably, the engaging member has an engaging hole, the engaging hole having a shape which is non-circular and is arranged to receive a mounting portion formed at one end of the first rotary shaft, the shape of the mounting portion and the engaging hole are complementary, whereby the engaging member and the first rotary shaft rotate together.

Preferably, the engaging member comprises an engaging plate in which the non-circular engaging hole is formed, and a plurality of engaging arms extending perpendicularly from the engaging plate, the engaging arms extending axially of the coupling to prevent circumferential displacement between the engaging member and the base and are respectively aligned with the projecting members.

Preferably, a wall of a cushioning member is disposed between the base and the second connecting member.

Preferably, the cushioning member is made of rubber and is formed on the base by molding the rubber to the base using an injection molding technique.

Preferably, recesses are formed in the base, the recesses extending in radial directions of the coupling; a plurality of axially extending perforations pass through the base and join with respective recesses; and the cushioning member comprises ribs disposed in the recesses and rods disposed in the perforations.

Preferably, the ends of the rods form boss portions, the boss portions being located at the end of the base remote from the projecting members to prevent axially displacement of the cushioning member from the base.

Preferably, the second connecting member comprises a connecting portion extending axially from one end of the main body, the connecting portion having a non-circular cross section that is arranged to mate with a fitting hole formed in one end of the second rotary shaft, the fitting hole and the connecting portion having complementary shapes.

Preferably, a spacer made of material having a hardness greater than the hardness of the second connecting member is disposed in a receiving slot formed in the second connecting member, and an axial force transmitting member is disposed in the base and arranged to make contact with the spacer and an axial end of the first rotary shaft.

According to a second aspect thereof, the present invention provides a torque transmission assembly comprising: a first rotary shaft; a second rotary shaft; and a coupling for linking the first rotary shaft to the second rotary shaft, the coupling comprising: a first connecting member connected to the first rotary shaft and rotating with the first rotary shaft; and a second connecting member connected to the second rotary shaft and rotating with the second rotary shaft, wherein the first connecting member comprises: a base comprising a plurality of projecting members extending along axial directions of the coupling, the projecting members being spaced from each other along circumferential direction of the coupling; and a metallic engaging member non-detachably engaging with the base, the engaging member directly connecting to the first rotary shaft; and wherein the second connecting member comprises: a main body and a plurality of drive arms radially and outwardly extending from peripheral portions of the main body, the drive arms extending along radial directions of the coupling and sandwiched between projecting members of the first connecting member, thereby, the first connecting member and the second connecting member rotate together.

Preferably, the base is made of plastic, integrally formed on the engaging member by injection molding.

Preferably, the engaging member has a non-circular engaging hole; and a mounting portion is formed at one end of the first rotary shaft, the shape of the mounting portion matching with the engaging hole and being inserted into the engaging hole, thereby the engaging member and the first rotary shaft rotates together.

Preferably, the engaging member comprises: an engaging plate in which the engaging hole is formed; and a plurality of engaging arms perpendicularly extending from the engaging plate, the engaging arms extending axial of the coupling to prevent circumferential displacement between the engaging member and the base.

Preferably, the coupling comprises a cushioning member having a wall that is sandwiched between the base and the second connecting member.

Preferably, the cushioning member is made of rubber and is integrally formed on the base by injection molding.

Preferably, a plurality of recesses is formed in one end of the base, the recesses extending in radial directions of the coupling; a plurality of perforations extend axially through the base and respectively join with the recesses; and the cushioning member comprises ribs disposed in the recesses and rods disposed in the perforations.

Preferably, the ends of the rods form boss portions, the boss portions being located at the end of the base remote from the projecting members to prevent axially displacement of the cushioning member from the base.

Preferably, the second connecting member comprises a connecting portion extending axially from one end of the main body, the connecting portion having a non-circular cross section; and a fitting hole is formed in one end of the second rotary shaft, the shape and size of the fitting hole matching with the size and shape of the connecting portion.

Preferably, the connecting portion has a prismatic shape.

Preferably, a spacer made of material having a hardness greater than the hardness of the second connecting member is fitted to a receiving slot formed in the second connecting member; and an axial force transmitting member is disposed in the base to make contact between the spacer and an axial end of the first rotary shaft.

According to embodiments of the present invention, the drive arms of the second connecting member extend in radial directions of the second connecting member and are sandwiched between the projecting members of the first connecting member. Compared to prior art couplings, the axial length of the coupling of the prevent invention is reduced by the thickness of one base.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
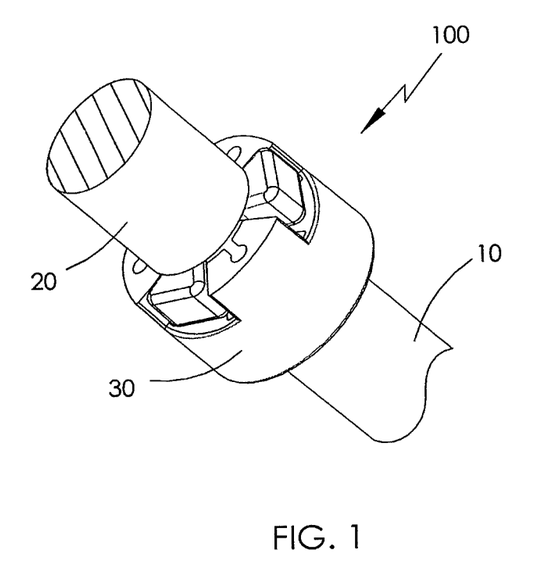
FIG. 1 illustrates a torque transmission assembly according to the preferred embodiment of the present invention.

Referring to FIG. 1, the torque transmission assembly 100 according to the preferred embodiment of the present invention comprises a drive shaft 10, an output shaft 20, and a coupling 30 for coaxially connecting the output shaft 20 to the drive shaft 10. Both the drive shaft 10 and the output shaft 20 are rotary shafts of undefined length. The drive shaft 10 could be the shaft of an electric motor. The output shaft 20 could be a worm shaft of a gear set. The torque of the drive shaft 10 is transmitted to the output shaft 20 via the coupling 30. For clarity, FIG. 1 shows only a part of the drive shaft 10 and the output shaft 20.

Figure 2:
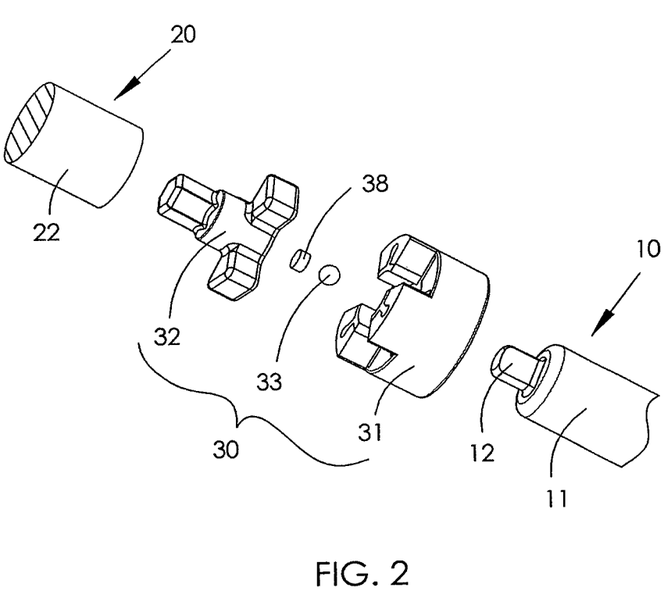
FIG. 2 is a partially exploded view of the torque transmission assembly of FIG. 1.
Figure 3:
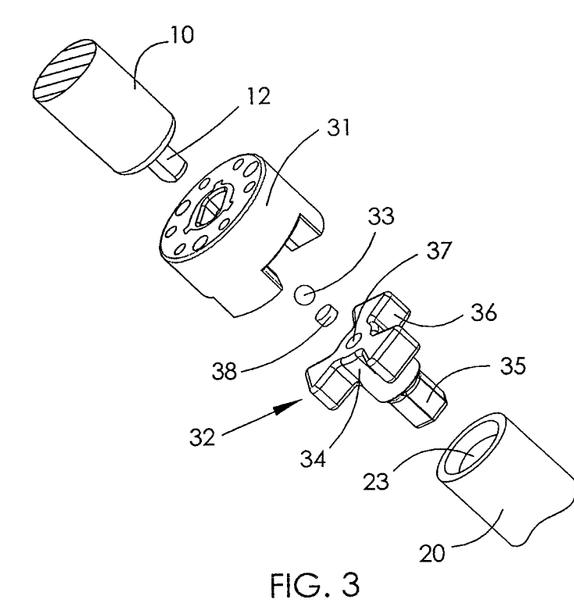
FIG. 3 is a partially exploded view of the torque transmission assembly of FIG. 1, viewed from a different aspect.

Referring to FIG. 2 and FIG. 3, the drive shaft 10 comprises a cylindrical shaft body 11 and a mounting portion 12 extending from the shaft body 11. The mounting portion 12 is fixed to a first connecting member 31 of the coupling 30, thus mounting the coupling 30 to the drive shaft 10. The transverse cross section of the mounting portion 12 is non-circular. In the present embodiment, the mounting portion 12 has two flat surfaces joined together by two arcuate surfaces, giving it a track-like shape. Alternatively, the cross section may have a rectangular, square or other polygonal shape. In the description, a transverse cross section is a cross section perpendicular to axial direction of the part being sectioned or of the coupling.

The output shaft 20 has a fixing portion 22 at an end thereof for connecting to the coupling. The output shaft may be configured as desired for the particular application. As such, the output shaft may have a worm, screw thread, cog, gear or pulley for driving a mechanism (not shown).

Figure 4:
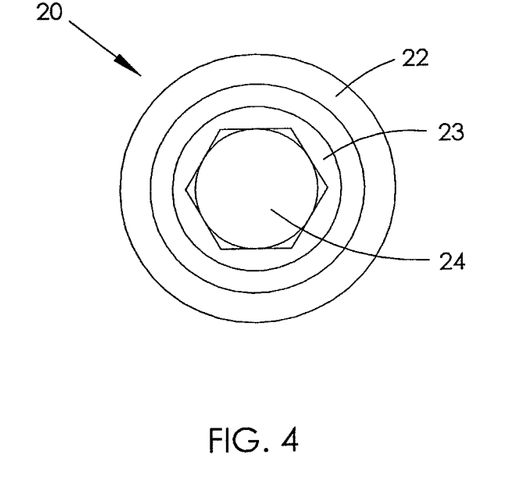
FIG. 4 is an end view of an output shaft, being a part of the torque transmission assembly of FIG. 1.

Referring to FIG. 4, the end face of the fixing portion 22 has a receiving hole 23 formed in its center portion and a fitting hole 24 formed at the bottom of the receiving hole. The fitting hole 24 is axial with the receiving hole 23. The receiving hole 23 is circular and has a tapered mouth. Preferably, the transverse cross section of the fitting hole 24 is non-circular. In the present embodiment, the transverse cross section of the fitting hole 24 is a regular hexagon, although polygonal shapes may be used. The diameter of the fitting hole 24 is, of course, smaller than the diameter of the receiving hole 23.

The coupling 30 comprises a first connecting member 31, a second connecting member 32 and a transmitting member 33. The first connecting member 31 is connected to the drive shaft 10. The second connecting member 32 is connected to the output shaft 20. The first connecting member 31 and the second connecting member 32 cooperate with each other, so that when the drive shaft 10 rotates the first connecting member 31, the second connecting member 32 rotates the output shaft 20. The transmitting member 33 is disposed between the drive shaft 10 and the second connecting member 32 and is axially aligned with the shafts, to transmit axial pressure or thrust between the drive shaft 10 and output shaft 20.

Figure 5:
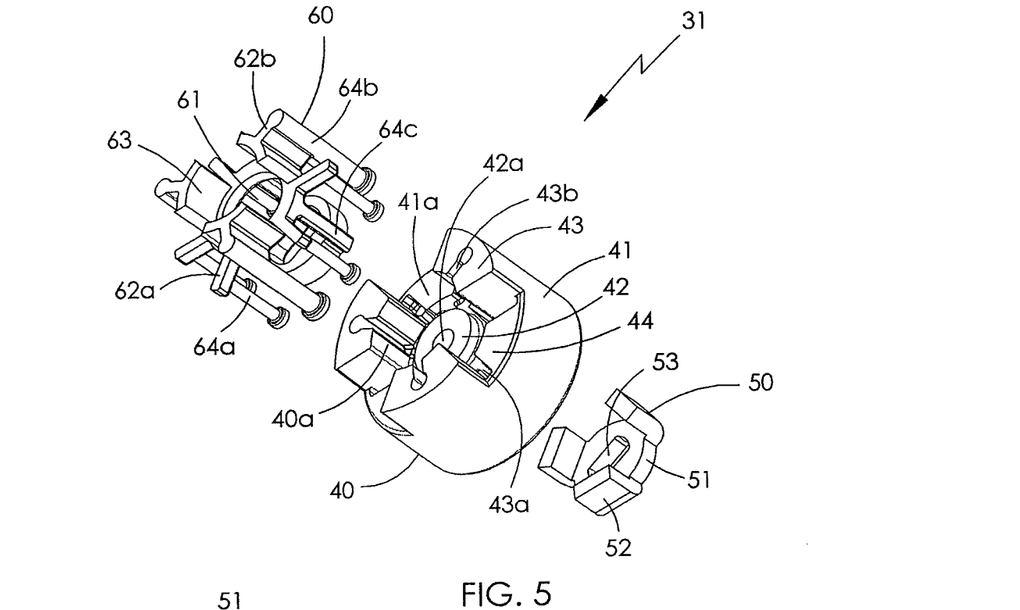
FIG. 5 is an exploded view of a first connecting member, being a part of the torque transmission assembly of FIG. 1.
Figure 6:
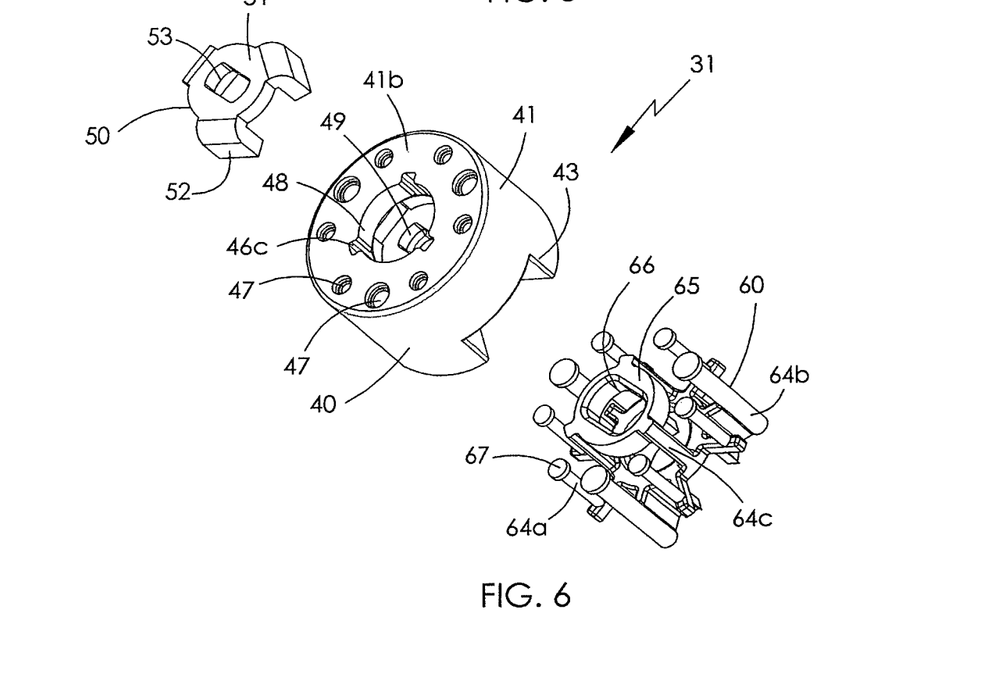
FIG. 6 is an exploded view of the first connecting member of FIG. 5, viewed from a different aspect.
Figure 7:
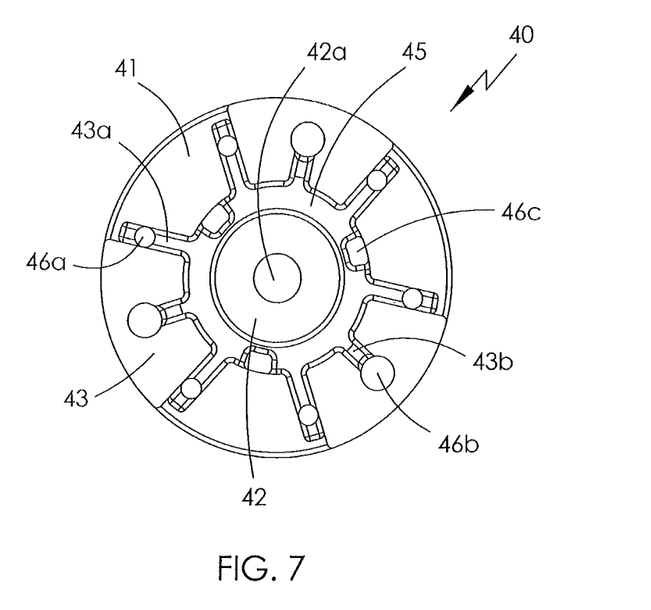
FIG. 7 is a plan view of the first connecting member of FIG. 5.

Referring to FIG. 5 to FIG. 7, the first connecting member 31 comprises a base 40, an engaging member 50 embedded in the base 40, and a cushioning member 60 fixed to the base 40. Preferably, the base 40 is made of plastic. Preferably, the engaging member 50 is metallic and has a higher strength and hardness than the base 40. The cushioning member 60 is made of a resiliently deformable material having cushioning properties, such as rubber.

The engaging member 50 comprises an engaging plate 51 and a number of engaging arms 52. The engaging plate 51 has in plate-like shape, having an engaging hole 53 at its center. The shape and size of the engaging hole 53 matches with the transverse cross section of the mounting portion 12. In the present embodiment, the engaging plate 51 is substantially circular. The engaging arms 52 extend from the radially outer edge of the engaging plate 51 in a direction perpendicular to the engaging plate 51. The engaging arms 52 are evenly spaced around the engaging plate 51. There are three engaging arms 52 in the present embodiment.

The base 40 comprises a body portion 41. The body portion 41 is substantially cylindrical. The axial ends of the body portion 41 form a first mounting end 41a and a second mounting end 41b, respectively. A boss 42 is formed at the center of the first mounting end 41a. The boss has a smaller axial height than the body portion 41. The axial face of the boss 42 is co-planar with the face of the first mounting end 41a and is defined by an annular groove 45. An accommodating hole 42a is formed in the center of the boss 42. The accommodating hole 42a extends axially of the first coupling member 31. A number of projecting members 43 extend axially from the first mounting end 41a and are evenly spaced circumferentially. Adjacent projecting members 43 form an accommodating slot 44 there between. As such, an accommodating space 40a is formed above the boss 42 and surrounded by the projecting members 43. The annular groove 45 is formed between the projecting members 43 and the boss 42. The cross section of each projecting member 43 is like a fan.

The body portion 41 has a number of pairs of first recesses 43a. Each recess of each pair of first recesses 43a is formed at respective circumferential sides of a corresponding projecting member 43. The first recesses 43a extend radially of the body portion 41 and communicate with the groove 45. A second recess 45 is formed in each projecting member 43b at its circumferential center portion. The second recesses 43b pass axially through the projecting member 43 and communicate with the groove 45 in the axial direction of the body portion 41. The second recesses 43b extend substantially radially of the body portion 41.

A plurality of first perforations 46a and a plurality of second perforations 46b extend axially through in the body portion 41. Both the first perforations 46a and the second perforations 46b extend to the second mounting end 41b. Each of the first perforations 46a joins with a corresponding first recess 43a at a radially outer portion of the corresponding first recess 43a. Each of the second perforations 46b joins with a corresponding second recess 43b at a radially outer portion of the corresponding second recess 43b. Openings 47 are formed in the ends of the first and second perforations at the second mounting end 41b of the body portion 41. The diameter of the openings 47 is larger than the diameter of the corresponding first perforation 46a or second perforation 46b, such that a stepped surface is formed.

The body portion 41 further comprises a plurality of third perforations 46c that axially pass through the body portion 41. The third perforations 46c extend from the groove 45 to the second mounting surface 41b. The third perforations 46c are evenly spaced from each other in the circumferential direction of the groove 45.

A circular slot 48 is formed at the center of the second mounting end 41b of the body portion 41. The slot 48 radially intersects with the third perforations 46c. The slot 48 has a predetermined depth in the axial direction of the body portion 41. A mounting hole 49 is further formed at the center of the slot 48 in the body portion 41. The shape and size of the mounting hole 49 matches with the engaging hole 53 of the engaging member 50. The slot 48, the mounting hole 49 and the accommodating hole 42a are sequentially connected in the axial direction and are preferably co-axial.

Figure 8:
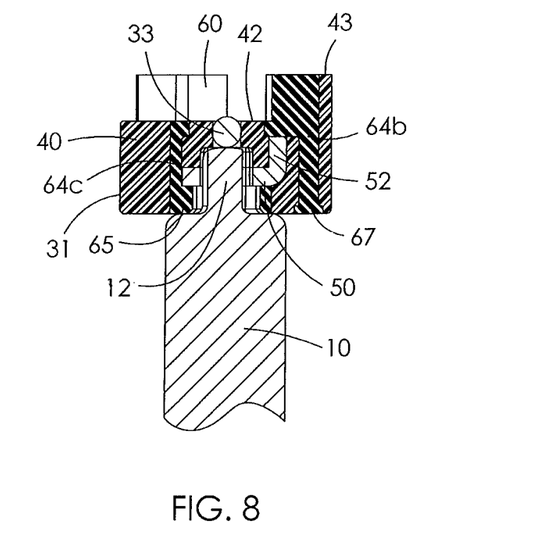
FIG. 8 is a sectional view of the first connecting member of FIG. 5 with a drive shaft fixed thereto.

FIG. 8 is a sectional view of the first connecting member 31 fitted to the drive shaft 10, showing the engaging member 50 embedded in the base 40. Preferably, the engaging member 50 is formed inside the base 40 as one piece by insert molding. By embedding the engaging member within the base, the engaging member can not be detached. The engaging hole 53 of the engaging member 50 is aligned with the mounting hole 49 of the base 40. The engaging arms 52 of the engaging member 50 are aligned with the projecting members 43 of the base 40.

The cushioning member 60 comprises an annular portion 61, a plurality of first ribs 62a radially and outwardly extending from the annular portion 61, a plurality of walls 63 axially and upwardly extending from the annular portion 61, a plurality of second ribs 62b radially and outwardly extending from circumferential center portions of the walls 63, a plurality of first rods 64a and a plurality of second rods 64b respectively extending axially from the first ribs 62a and the second ribs 62b in the axial direction of the annular portion 61, a plurality of third rods 64c axially extending from the annular portion 61, and a connecting portion 65 connected to the ends of the third rods 64c and surrounded by the third rods 64c. A connecting opening 66 is formed in the center of the connecting portion 65. The shape of the connecting opening 66 corresponds to the shape of the mounting hole 49, but the size of the connecting opening 66 is larger than the size of the mounting hole 49. Therefore, when the drive shaft 10 is mounted to the first connecting member 31, the mounting portion 12 of the drive shaft 10 does not touch the connecting portion 65 of the cushioning member.

The annular portion 61 is disposed in the groove 45 of the base 40. The first ribs 62a and the second ribs 62b locate in the first recesses 43a and the second recesses 43b respectively. The walls 63 are located at a radially inner surface of the projecting members 43. The first rods Ma, the second rods 64b and the third rods 64c pass through the first perforations 46a, the second perforations 46b and the third perforations 46c of the base 40 respectively. The connecting portion 65 is located in the slot 48 of the base 40. Each of the ends 67 of the first rods 64a and the second rods 64b mate with the corresponding opening 47, preferably forming boss portions received in the openings 47.

Preferably, the cushion member is formed on the base 40 by an over molding process. That is, the base 40 is first formed by placing the engaging member 50 into a mold and injecting plastic to form the base with the engaging member embedded. The base is then placed in another mold and the rubber material is injected into the mold to form the cushioning member on the base, thus forming the first connecting member 31. Since the ends 67 of the rods abut the stepped surface of the openings 47, axial displacement between the cushioning member 60 and the base 40 is prevented. The first ribs 64a, the second ribs 64b and the third ribs 64c mate with the first perforations 46a, the second perforations 46b and the third perforations 46c respectively to prevent circumferential movement between the cushioning member 60 and the base 40.

Referring to FIG. 3 again, the second connecting member 32 comprises a main body 34, a connecting portion 35 axially extending from one axial end of the main body 34, and a plurality of drive arms 36 radially extending from the other axial end of the main body 34. The main body 34 is substantially cylindrical. The shape and the size of the connecting portion 35 match with the fitting hole 24 of the output shaft 20. In the present embodiment, the transverse cross section of the connecting portion 35 is a regular hexagon. It should be understood that the transverse cross section could be another shape, such as quadrilateral, pentagonal, etc. The drive arms 36 are circumferentially evenly spaced from each other. It should be understood that the arms do not need to extend in strictly absolute radial directions of the main body. Preferably, the second connecting member 32 is made of metal material by way of casting.

The connecting portion 35 of the second connecting member 32 is fitted in the fitting hole 24 of the output shaft 20 so that the torque of the second connecting member 32 is transmitted to the output shaft 20. In addition, the portion of the main body 34 adjacent to the connecting portion 35 is received in the receiving hole 23 of the output shaft 20. In the present embodiment, the receiving hole 23 is for ensuring the concentricity between the second connecting member 32 and the output shaft 20, with the tapered mouth aiding insertion of the main body. It should be understood that the output shaft 20 could provide only the fitting hole 24 without the receiving hole 23. The connecting portion 35 of the second connecting member 32 is still fitted inside the fitting hole 24 and torque is transmitted to the output shaft 20 via the second connecting member 32. In that case, preferably, the axial length of the main body 34 is substantially equal to the thickness of the drive arms 36 in the axial direction of the main body 34, to optimize the axial length of the coupling 30.

Optionally, the output shaft 20 and the second connecting member 32 could be connected in a manner similar to the connection between the drive shaft and the first connecting member and vise versa. In this arrangement the connecting portion 35 is omitted and the connecting hole is formed in the main body 34 with a connecting spigot formed on the end of the output shaft.

The drive arms 36 of the second connecting member 32 are accommodated in the accommodating slots 44 of the first connecting member 31, respectively. Each of the drive arms 36 is sandwiched between two corresponding adjacent projecting members 43, so that the first connecting member 31 can rotate the second connecting member 32 and thus drive the output shaft 20. As the walls 63 of the cushioning member 60 are located between the projecting members 43 of the base and the main body 34 of the second connecting member 32, the cushioning member is able to absorb or tolerate any slight misalignment between the two shafts, either due to the axis of the shafts being offset or being skewed.

The axial transmitting member 33 is spherical in shape. Preferably the axial transmitting member is a steel ball, which is accommodated in the accommodating hole 42a. When the torque transmission assembly 100 is assembled, the transmitting member 33 is disposed between the end of the drive shaft 10 and the second connecting member 32, so that axial compressive forces or thrust forces may be transmitted between the drive shaft 10 and the second connecting member 32. Generally, where the output shaft has a thread or worm gear, axially forces on the output shaft will be generated when driving the load. The axial transmitting member allows the drive shaft to support the output shaft against axial forces forcing the output shaft towards the drive shaft and vise versa. It should be understood that in the case that the drive shaft 10 directly touches the output shaft 20, axial compressive force could also be transmitted. In this case, the axial transmitting member 33 and the accommodating hole 42a are not necessary. However, the axial transmitting member provides a lower friction method.

Preferably, the second connecting member 32 has a receiving slot 37 formed in the center of the end having the drive arms 36. The receiving slot 37 is a blind hole. A cylindrical spacer 38 is received in the receiving slot 37, for making contact with the transmitting member 33. Preferably, the spacer 38 is made of tool steel by quenching, so it will have high hardness. Since the spacer 38 has higher hardness than the second connecting member 32, deformation of the second connecting member 32 due to direct contact with the axial transmitting member 33 is prevented or at least reduced.

The cushioning member 60 is for cushioning the impact force between the first connecting member 31 and the second connecting member 32. It should be understood that in absent of the cushioning member 60, a coupling could still transmit torque. Besides, the connecting relationship of the drive shaft 10, the output shaft 20 and the coupling 30 could be reversed. For instance, the drive shaft 10 could connect to the second connecting member 32 and the output shaft 20 could connect to the first connecting member 31.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A coupling for coaxially connecting a first rotary shaft to a second rotary shaft, the coupling comprising:
   a first connecting member arranged to be connected to the first rotary shaft for rotation there with;
   a second connecting member arranged to be connected to the second rotary shaft for rotation there with; and
   a cushioning member;
   wherein the first connecting member comprises:
      a base comprising a plurality of projecting members extending in the axial direction of the coupling, the projecting members being spaced from each other in the circumferential direction of the coupling; and
      a metallic engaging member, non-detachably engaged with the base, the engaging member being directly connectable to the first rotary shaft;
   wherein the second connecting member comprises a main body and a plurality of drive arms extending from peripheral portions of the main body, the drive arms extending in radial directions of the coupling and respectively sandwiched between adjacent projecting members of the first connecting member, thereby the first connecting member and the second connecting member rotate together;
   wherein the cushioning member having a wall that is sandwiched between the base and the second connecting member; and
   wherein recesses are formed in the base, the recesses extending in radial directions of the coupling;
   a plurality of axially extending perforations pass through the base and join with respective recesses; and
   the cushioning member comprises ribs disposed in the recesses and rods disposed in the perforations.

2. The coupling of claim 1, wherein the base is made of plastic, and the engaging member is embedded in the base.

3. The coupling of claim 2, wherein the engaging member has an engaging hole, the engaging hole having a shape which is non-circular and is arranged to receive a mounting portion formed at one end of the first rotary shaft, the shape of the mounting portion and the engaging hole are complementary, whereby the engaging member and the first rotary shaft rotate together.

4. The coupling of claim 3, wherein the engaging member comprises: an engaging plate in which the non-circular engaging hole is formed, and
a plurality of engaging arms extending perpendicularly from the engaging plate, the engaging arms extending axially of the coupling to prevent circumferential displacement between the engaging member and the base and are respectively aligned with the projecting members.

5. The coupling of claim 1, wherein the cushioning member is made of rubber, and is formed on the base by injection molding the cushioning member to the base.

6. The coupling of claim 1, wherein ends of the rods form boss portions, the boss portions being located at the end of the base remote from the projecting members to prevent axially displacement of the cushioning member from the base.

7. The coupling of claim 6, wherein:
the ribs comprise at least one rib extending radially and outwardly from a circumferential center portion of the wall;
the rods comprise a rod extending from a radially outer end of the at least one rib; and
the base of the first connecting member has a cylindrical body portion having a first axial end from which the projecting members extend and a second axial end opposite to the first axial end, the second axial end of the base defines a slot at a central portion for receiving the first rotary shaft and an opening spaced from the slot for receiving the boss portion of the rod of the cushioning member.

8. The coupling of claim 1, wherein the second connecting member comprises a connecting portion extending axially from one end of the main body, the connecting portion having a non-circular cross section that is arranged to mate with a fitting hole formed in one end of the second rotary shaft, the fitting hole and the connecting portion having complementary shapes.

9. The coupling of claim 8, wherein the transverse cross section of the fitting hole is a hexagon, and the transverse cross section of the connecting portion is a hexagon.

10. The coupling of claim 1, wherein a spacer made of material having a hardness greater than the hardness of the second connecting member is disposed in a receiving slot formed in the second connecting member, and an axial force transmitting member is disposed in the base and arranged to make contact with the spacer and an axial end of the first rotary shaft.

11. A torque transmission assembly comprising:
a first rotary shaft;
a second rotary shaft; and
a coupling for linking the first rotary shaft to the second rotary shaft, the coupling comprising:
a first connecting member connected to the first rotary shaft and rotating with the first rotary shaft;
a second connecting member connected to the second rotary shaft and rotating with the second rotary shaft; and
a cushioning member,
wherein the first connecting member comprises:
a base comprising a plurality of projecting members extending along the axial directions of the coupling, the projecting members being spaced from each other along a circumferential direction of the coupling; and
a metallic engaging member non-detachably engaging with the base, the engaging member directly connecting to the first rotary shaft;
wherein the second connecting member comprises:
a main body and a plurality of drive arms radially and outwardly extending from peripheral portions of the main body, the drive arms extending along radial directions of the coupling and sandwiched between projecting members of the first connecting member, thereby, the first connecting member and the second connecting member rotate together;
wherein the cushioning member having a wall that is sandwiched between the base and the second connecting member; and
wherein a plurality of recesses is formed in one end of the base, the recesses extending in radial directions of the coupling;
a plurality of perforations extend axially through the base and respectively join with the recesses; and
the cushioning member comprises ribs disposed in the recesses and rods disposed in the perforations.

12. The torque transmission assembly of claim 11, wherein the base is made of plastic, integrally formed on the engaging member by injection molding.

13. The torque transmission assembly of claim 12, wherein the engaging member comprises a non-circular engaging hole; and
a mounting portion is formed at one end of the first rotary shaft, the shape of the mounting portion matching with the engaging hole and being inserted into the engaging hole, thereby the engaging member and the first rotary shaft rotates together.

14. The torque transmission assembly of claim 13, wherein the engaging member comprises: an engaging plate forming the engaging hole; and
a plurality of engaging arms perpendicularly extending from the engaging plate, the engaging arms extending axial of the coupling to prevent circumferential displacement between the engaging member and the base.

15. The torque transmission assembly of claim 11, wherein the cushioning member is made of rubber and is integrally formed on the base by injection molding.

16. The torque transmission assembly of claim 11, wherein the ends of the rods form boss portions, the boss portions being located at the end of the base remote from the projecting members to prevent axially displacement of the cushioning member from the base.

17. The torque transmission assembly of claim 16, wherein:
the ribs comprise at least one rib extending radially and outwardly from a circumferential center portion of the wall;
the rods comprise a rod extending from a radially outer end of the at least one rib; and
the base of the first connecting member has a cylindrical body portion having a first axial end from which the projecting members extend and a second axial end opposite to the first axial end, the second axial end of the base defines a slot at a central portion for receiving the first rotary shaft and an opening spaced from the slot for receiving the boss portion of the rod of the cushioning member.

18. The torque transmission assembly of claim 11, wherein the second connecting member comprises a connecting portion extending axially from one end of the main body, the connecting portion having a non-circular cross section; and a fitting hole is formed in one end of the second rotary shaft, the shape and size of the fitting hole matching with the connecting portion.

19. The torque transmission assembly of claim 18, wherein the connecting portion has a prismatic shape.

20. The torque transmission assembly of claim 18, wherein the transverse cross section of the fitting hole is a hexagon, and the transverse cross section of the connecting portion is a hexagon.

21. The torque transmission assembly of claim 11, wherein a spacer made of material having a hardness greater than the hardness of the second connecting member is fitted to a receiving slot formed in the second connecting member; and
   an axial force transmitting member is disposed in the base to make contact between the spacer and an axial end of the first rotary shaft.

* * * * *